US012445218B2

(12) United States Patent
Kim et al.

(10) Patent No.: US 12,445,218 B2
(45) Date of Patent: Oct. 14, 2025

(54) WIRELESS AUDIO OUTPUT DEVICE FOR OUTPUTTING AUDIO CONTENT, AND METHOD THEREFOR

(71) Applicant: LG ELECTRONICS INC., Seoul (KR)

(72) Inventors: Jongmin Kim, Seoul (KR); Byounghak Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 264 days.

(21) Appl. No.: 18/028,073

(22) PCT Filed: Oct. 6, 2020

(86) PCT No.: PCT/KR2020/013559

§ 371 (c)(1),
(2) Date: Mar. 23, 2023

(87) PCT Pub. No.: WO2022/075494

PCT Pub. Date: Apr. 14, 2022

(65) Prior Publication Data

US 2023/0336262 A1 Oct. 19, 2023

(51) Int. Cl.
*H04R 3/12* (2006.01)
*H04H 20/86* (2008.01)
*H04H 40/27* (2008.01)

(52) U.S. Cl.
CPC ............ *H04H 40/27* (2013.01); *H04H 20/86* (2013.01); *H04R 3/12* (2013.01); *H04R 2420/07* (2013.01)

(58) Field of Classification Search
CPC ............................. H04R 3/12; H04R 2420/07; H04R 2227/005; H04R 27/00
USPC ...................................................... 381/77–85
See application file for complete search history.

(56) References Cited

U.S. PATENT DOCUMENTS 9,679,563 B2 * 6/2017 Lee ......................... G10L 15/22
10,475,454 B2 * 11/2019 Shah ....................... G10L 15/22
10,534,574 B2 * 1/2020 Katayama ............ H04R 29/001
11,381,271 B1 * 7/2022 Zalewski .............. H04W 76/10
(Continued)

FOREIGN PATENT DOCUMENTS

KR 10-2017-0034201 3/2017
KR 10-2018-0098932 9/2018
KR 10-1948863 2/2019

OTHER PUBLICATIONS

PCT International Application No. PCT/KR2020/013559, International Search Report dated Jul. 5, 2021, 4 pages.

*Primary Examiner* — Disler Paul
(74) *Attorney, Agent, or Firm* — LEE, HONG, DEGERMAN, KANG & WAIMEY

(57) ABSTRACT

One embodiment of the present disclosure provides a wireless audio output device for outputting audio content, comprising: an audio output unit; a communication unit for receiving audio broadcast signals; and a processor for generating a broadcast channel list including one or more output candidate channels from among received broadcast channels corresponding to the audio broadcast signals, outputting the broadcast channel list through the audio output unit, selecting one output channel from the broadcast channel list on the basis of a user input, and outputting audio content corresponding to the output channel through the audio output unit.

14 Claims, 8 Drawing Sheets

(56) References Cited

U.S. PATENT DOCUMENTS

| | | | | |
|---|---|---|---|---|
| 2014/0219469 | A1* | 8/2014 | Geis | H04R 27/00 381/81 |
| 2015/0140982 | A1 | 5/2015 | Postrel | |
| 2015/0334478 | A1* | 11/2015 | Nguyen | H04S 7/308 381/80 |
| 2017/0041856 | A1 | 2/2017 | Kim et al. | |
| 2017/0086204 | A1 | 3/2017 | Jung et al. | |
| 2018/0249517 | A1 | 8/2018 | Park et al. | |
| 2021/0105588 | A1 | 4/2021 | Lim | |

* cited by examiner

FIG. 9

900

| | | 911 | 912 | 913 | 914 |
|---|---|---|---|---|---|
| | | channel name | content providing device name | location of the content providing device | content type |
| 921 | 1 | facility guidance | | | |
| 922 | 2 | | | | news |
| 923 | 3 | | USER A's LG TV | | |
| 924 | 4 | | | Incheon Airport Terminal 1 and in front of Gate 9 | |

FIG. 10

1000

| | | 1011 | 1012 | 1013 | 1014 |
|---|---|---|---|---|---|
| | | channel name | name of content providing device | location of the content providing device | content type |
| 1021 | 1 | YY home shopping | | | |
| 1022 | 2 | | | | advertisement |

WIRELESS AUDIO OUTPUT DEVICE FOR OUTPUTTING AUDIO CONTENT, AND METHOD THEREFOR

CROSS-REFERENCE TO RELATED APPLICATIONS

This application is the National Stage filing under 35 U.S.C. 371 of International Application No. PCT/KR2020/013559, filed on Oct. 6, 2020, the contents of which are hereby incorporated by reference herein in its entirety.

TECHNICAL FIELD

The present disclosure relates to a wireless audio output device and method for outputting audio content.

BACKGROUND ART

A conventional wireless audio output device is connected to a content providing device through a wireless communication technology (example, Wi-Fi™, Bluetooth™, etc.) and outputs sound based on an audio signal received from the content providing device. The wireless audio output device may remain connected to only one content providing device at most, and may receive and output an audio signal from the connected content providing device. This is because conventional wireless communication technologies can transmit and receive data signals to each other only after establishing a connection between devices.

In the future, it can be expected that data transmission and reception will be possible without establishing a connection between devices by broadcasting a data signal using a wireless broadcast technology. However, even if a plurality of content providing devices broadcast audio signal, the audio broadcast signals received by the wireless audio output device have different reception intensities, and the wireless audio output device can only output audio corresponding to one audio broadcast signal. Therefore, which broadcast channel is provided as a candidate output channel among broadcast channels corresponding to various audio broadcast signals received by the wireless audio output device is an important factor that greatly affects user satisfaction.

DISCLOSURE

Technical Problem

An object of the present disclosure is to provide a wireless audio output device and method for receiving an audio broadcast signal, filtering and guiding an inappropriate channel among the received broadcast channels.

In addition, the present disclosure intends to provide a wireless audio output device and method for providing a broadcast channel list to a user and selecting one output channel based on a user's input to output audio content.

Technical Solution

A wireless audio output device for outputting audio content according to an embodiment of the present disclosure may comprise: an audio output unit; a communication unit configured to receive audio broadcast signals; and a processor configured to: generate a broadcast channel list including one or more output candidate channels among received broadcast channels corresponding to the audio broadcast signals, output the broadcast channel list through the audio output unit, select one output channel from the broadcasting channel list based on a user's input, and output the audio content corresponding to the output channel through the audio output unit.

Wherein the processor may sequentially output channel information for the one or more output candidate channels included in the broadcast channel list through the audio output unit.

Wherein the channel information may include at least one of a channel name corresponding to the output candidate channel, a name of the content providing device corresponding to the output candidate channel, a location of the content providing device corresponding to the output candidate channel, or a name of a content provided by the output candidate channel.

The wireless audio output device may further comprise a memory configured to store a broadcast channel whitelist and a broadcast channel blacklist, wherein the processor may select the one or more output candidate channels from among the received broadcast channels by considering at least one of the broadcast channel whitelist, the broadcast channel blacklist, or a received signal strength indicator (RSSI).

Wherein the processor may select a broadcast channel included in the broadcast channel whitelist is selected as the output candidate channel, and may not select a broadcast channel included in the broadcast channel blacklist or a broadcast channel which the RSSI is lower than a reference value as the broadcast candidate channel.

Wherein the processor may sort the one or more output candidate channels included in the broadcast channel list based on at least one of a user preference or the RSSI, and sequentially output the channel information of the one or more output candidate channels included in the broadcast channel list in a sorted order through the audio output unit.

Wherein the processor may calculate the user preference based on at least one of an accumulated output time, an output frequency, and an output time point for the candidate output channel.

Wherein the processor may calculate the user preference to be higher as the accumulated output time is longer, the output frequency is higher, and the output time point is more recent for the output candidate channel.

The wireless audio output device may further comprise a microphone configured to receive a channel selection voice of the user, wherein the processor may select the one output channel from the one or more output candidate channels based on the channel selection voice.

The wireless audio output device may further comprise a short-range communication module, the processor may select the output channel by recognizing a short-range communication tag of the content providing device corresponding to the one or more output candidate channels through the short-range communication module.

The wireless audio output device may further comprise a user input unit configured to receive a button input of the user, wherein the processor may select the output channel from among the one or more output candidate channels based on the button input.

Wherein the processor may change the output channel to another broadcast channel included in the broadcast channel list based on the button input.

A method of outputting audio content according to an embodiment of the present disclosure, the method comprises: receiving audio broadcast signals; generating a broadcast channel list including one or more output candidate channels among received broadcast channels corresponding to the audio broadcast signals; outputting the broadcast channel list; selecting one output channel from the broadcasting channel list based on a user's input, and outputting the audio content corresponding to the output channel.

Advantageous Effects

According to various embodiments of the present disclosure, a wireless audio output device may receive an audio broadcast signal to output audio content without being connected to an audio content providing device.

In addition, according to various embodiments of the present disclosure, information on a broadcast channel being broadcasted may be provided to a user even if there is no display.

In addition, according to various embodiments of the present disclosure, it is possible to provide the user with information on broadcast channel excluding broadcast channel of poor reception quality or not preferred by the user.

DESCRIPTION OF DRAWINGS

FIG. 9 is a diagram illustrating a broadcast channel whitelist according to an embodiment of the present disclosure.

FIG. 10 is a diagram illustrating a broadcast channel blacklist according to an embodiment of the present disclosure.

BEST MODE

Figure 1:
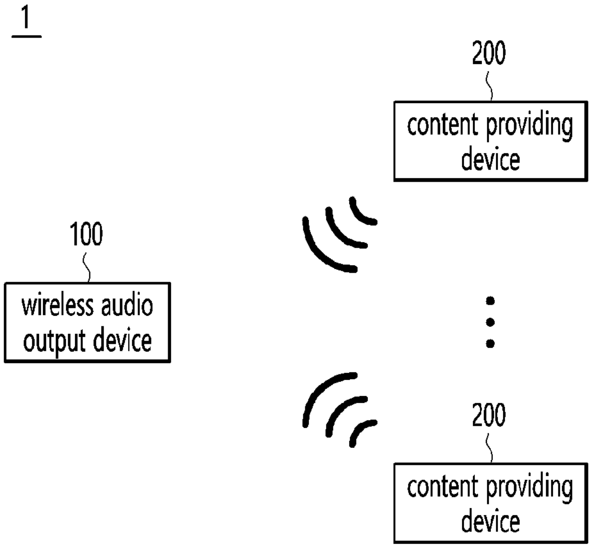
FIG. 1 is a block diagram illustrating a content broadcasting system 1 according to an embodiment of the present disclosure.

Hereinafter, the embodiments disclosed in this specification will be described in detail with reference to the accompanying drawings, but the same or similar elements are given the same reference numerals regardless of reference numerals, and redundant description thereof will be omitted. The suffixes 'module' and 'unit' for the elements used in the following description are given or used together in consideration of ease of writing the specification, and do not have meanings or roles that are distinct from each other by themselves. In addition, in describing the embodiments disclosed in this specification, if it is determined that a detailed description of a related known technology may obscure the gist of the embodiment disclosed in this specification, the detailed description thereof will be omitted. In addition, the accompanying drawings are only for easy understanding of the embodiments disclosed in this specification, the technical idea disclosed in this specification is not limited by the accompanying drawings, and all changes included in the spirit and technical scope of the present disclosure, it should be understood to include equivalents or substitutes.

Terms including ordinal numbers, such as first and second, may be used to describe various components, but the elements are not limited by the terms. These terms are only used for the purpose of distinguishing one element from another.

It should be understood that when an element is referred to as being 'connected' or 'connected' to another element, it may be directly connected or connected to the other element, but other elements may exist in the middle. On the other hand, when an element is referred to as being 'directly connected' or 'directly connected' to another element, it should be understood that no other element exists in the middle.

FIG. 1 is a block diagram illustrating a content broadcasting system 1 according to an embodiment of the present disclosure.

Referring to FIG. 1, a content broadcasting system 1 may include a wireless audio output device 100 and one or more content providing devices 200 and the like.

The wireless audio output device 100 may refer to a device that receives a content broadcasting signal transmitted from the content providing device 200 using a wireless communication technology, and outputs an audio corresponding to the received content broadcasting signal (in particular, an audio broadcast signal). Accordingly, the wireless audio output device 100 is a device capable of receiving signal transmitted from the content providing device 200, and is not required to establish a connection with the content providing device 200.

The wireless audio output device 100 may refer to various devices such as a TV, a radio receiver, a mobile phone, a smart phone, a wireless speaker, a wireless earphone, and a wireless headphone that can wirelessly receive and output an audio signal.

The wireless audio output device 100 may include one or more audio output units or speakers, and may output sound of the same channel or sound of different channels through each audio output unit. For example, the wireless audio device 100 may include two audio output units such as a headphone or a neckband earphone and in this case, the wireless audio output device 100 may output left channel audio and right channel audio through each audio output unit.

In one embodiment, a plurality of wireless audio output devices 100 may operate as a group, and the group of wireless audio output devices may operate like one wireless audio output device including a plurality of audio output units. For example, even if each of the two wireless audio output devices 100 includes only one audio output unit, one of these two wireless audio output devices 100 outputs the left channel audio corresponding to the left channel audio signal, and the other one may output the right channel audio corresponding to the right channel audio signal.

In one embodiment, a plurality of wireless audio output devices 100 may be operated as a group, one wireless audio output device can function as a master wireless audio output device, and the remaining wireless audio output device can function as slave wireless audio output devices. In this case, the slave wireless audio output device may output audio based on an audio signal or channel information transmitted from the master wireless audio output device. The slave wireless audio output device may be interlocked with the master wireless audio output device, and may output the same broadcast channel as the broadcast channel output from the master wireless audio output device.

The content providing device 200 refers to a device for providing content data including audio using a wireless communication technology, and may broadcast a content broadcast signal corresponding to the content data. The content broadcast signal includes an audio broadcast signal corresponding to audio content, and may further include a broadcast signal corresponding to at least one of video content and text content.

The content providing device 200 may refer to various devices such as a radio base station, a terrestrial base station, a broadcasting satellite, a content data server, and a TV capable of transmitting a content broadcast signal.

Figure 2:
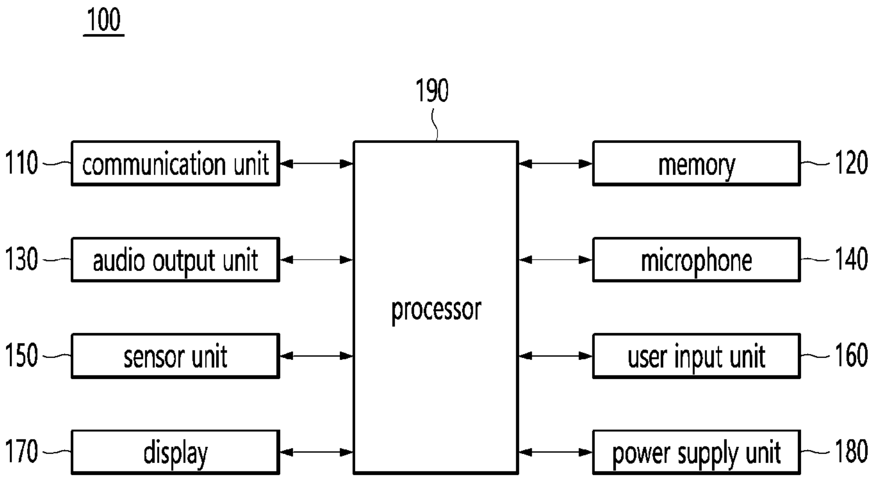
FIG. 2 is a diagram illustrating a wireless audio output device 100 according to an embodiment of the present disclosure.

FIG. 2 is a diagram illustrating a wireless audio output device 100 according to an embodiment of the present disclosure.

Referring to FIG. 2, the wireless audio output device 100 includes a processor 190, a communication unit 110, a memory 120, an audio output unit 130, a microphone 140, a sensor unit 150, a user input unit 160, a display 170 and a power supply unit 180.

The communication unit 110 may transmit/receive data with an external device such as the content providing device 200 using a wireless communication technology, and may include an antenna for transmitting/receiving a wireless signal.

The communication unit 110 may receive a content signal from the content providing device 200 after establishing a connection with the content providing device 200 through pairing, but provide content without establishing a connection with the content providing device 200. A content broadcast signal broadcast from the device 200 may be received.

Communication technologies used by the communication unit 110 include Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency IDentification (RFID), Infrared Data Association (IrDA), ZigBee, Near Field Communication (NFC), and the like.

The communication unit 110 may be referred to as a communication modem or a communication interface.

The memory 120 may store program for processing and controlling each signal in the processor 190, and may permanently or temporarily store signal-processed video, audio, or data signal. For example, the memory 120 may store permanently or temporarily data received through the communication unit 110, audio data obtained from the microphone 140, sensor data obtained from the sensor unit 150, input signal obtained through the user input unit 160, and the like.

The audio output unit 130 may include a diaphragm, an audio coil, and a permanent magnet that forms a magnetic field around the audio coil. When power is applied to the acoustic coil, an electromagnetic force is generated in a magnetic field formed by the permanent magnet to move the acoustic coil, and a diaphragm vibrates according to the movement of the acoustic coil, so that sound can be output.

The microphone 140 converts sound waves into electrical audio data. The converted audio data may be transmitted to an external server (not shown) through the communication unit 110. Various noise cancellation algorithms for removing noise generated in the process of receiving external sound waves may be implemented in the microphone 140.

The sensor unit 150 may obtain information about a state of the wireless audio output device 100 itself and surrounding condition. The sensor unit 150 may include an illuminance sensor for detecting ambient brightness, a touch sensor for detecting a touch input, a gyro sensor or an acceleration sensor for detecting the tilt and position of the wireless audio output device 100, and the like.

The user input unit 160 may refer to an input unit or an input interface for a user to control the wireless audio output device 100. The wireless audio output device 100 may use a touch format or use a limited number of buttons to expand control commands that can be input by combining the time and number of button presses and a plurality of buttons.

The user input unit 160 may include a keypad, buttons, a touch pad, or a touch screen. A user may input a control command for the wireless audio output device 100 through the user input unit 160. When the user input unit 160 includes a hard key button, the user may input a control command to the wireless audio output device 100 through a push operation of the hard key button.

If the user input unit 160 includes a touch screen, the user may input a control command for the wireless audio output device 100 by touching a soft key on the touch screen. In addition, the user input unit 160 may include various types of input means that the user can manipulate, such as a scroll key or a jog key. The user input unit 160 may transfer a control signal input from a local key (not shown) such as a power key, a channel key, a volume key, and a setting key to the processor 190.

The display 170 displays (outputs) information processed by the wireless audio output device 100. For example, the wireless audio output device 170 may display execution screen information of an application program driven in the wireless audio output device 100, or UI (User Interface) and GUI (Graphic User Interface) information according to such execution screen information.

The display 170 may output an image by converting a video signal, data signal, OSD signal processed by the processor 190, or a video signal or data signal received from the communication unit 110 into R, G, and B signals, respectively.

The display 170 may implement a touch screen by forming a mutual layer structure or integrally with the touch sensor. Such a touch screen may function as a user input unit 160 providing an input interface between the wireless audio output device 100 and the user, and at the same time provide an output interface between the wireless audio output device 100 and the user.

The power supply unit 180 may supply power necessary for the processor 190 and each element, and include a battery. And, the power supply unit 180 may include a power terminal connected to an external power source to charge the battery. In an embodiment, the power terminal may be in contact with a power terminal formed in a cradle on which the wireless audio output device 100 is mounted to receive power from an external power source.

The processor 190 may control overall operation of the wireless audio output device 100.

The processor 190 may control the wireless audio output device 100 according to a user command input through the user input unit 160 or an internal program, access the network, and download an application or application list desired by the user to the wireless audio output device.

The processor 190 may output the channel information selected by the user along with the processed video signal or audio signal through the display 170 or the audio output unit 130.

The image signal processed by the processor 190 may be input to the display unit 151 and displayed as an image corresponding to the corresponding image signal. Also, an image signal processed by the processor 190 may be input to an external output device through the communication unit 110 or an external device interface unit (not shown).

A voice signal processed by the processor 190 may be output through the audio output unit 130. Also, the voice signal processed by the processor 190 may be input to an external output device through the communication unit 110 or an external device interface unit (not shown).

The processor 190 may determine at least one executable operation of the wireless audio output device 100 based on information determined or generated using a data analysis algorithm or a machine learning algorithm. Also, the processor 190 may perform the determined operation by controlling elements of the wireless audio output device 100. To this end, the processor 190 may request, search, receive, or utilize data of a learning processor (not shown) or memory 120, and control elements of the wireless audio output device 100 to execute a predicted operation or an operation determined to be desirable among the at least one executable operation.

The processor 190 may generate a control signal for controlling the external device and transmit the generated control signal to the external device when the connection of the external device is required to perform the determined operation.

The processor 190 may directly or through an external device (not shown) obtain intent information for a user input and determine a user's requirement based on the acquired intent information.

The processor 190 may obtain intent information corresponding user input using at least one of a STT (Speech To Text) engine for converting a voice input into a character string or a Natural Language Processing (NLP) engine for acquiring intent information of a natural language. At least one or more of the STT engine or the NLP engine may be configured at least a part of an artificial neural network trained according to a machine learning algorithm. In addition, at least one or more of the STT engine or NLP engine may have been learned by a learning processor (not shown), learned by a learning processor (not shown) of an artificial intelligence server (not shown), or learned by distributed processing thereof.

The processor 190 may collect history information including user feedback on the operation contents or operation of the wireless audio output device 100 to store it in the memory 120 or an external device such as an artificial intelligence server (not shown). The collected history information can be used to update the learning model.

The processor 190 may control at least some of the elements of the wireless audio output device 100 to drive an application program stored in the memory 120. Furthermore, the processor 190 may combine and operate two or more of the elements included in the wireless audio output device 100 to drive the application program.

Meanwhile, the wireless audio output device 100 shown in FIG. 1 is merely an embodiment of the present disclosure, and some of the illustrated elements may be integrated, added or omitted according to specifications of the actually implemented wireless audio output device 100.

In one embodiment, two or more elements of the wireless audio output device 100 may be combined into one element, or one element may be subdivided into two or more elements. In addition, the function performed in each block are for explaining an embodiment of the present disclosure, and the specific operation or device does not limit the scope of the present disclosure.

Figure 3:
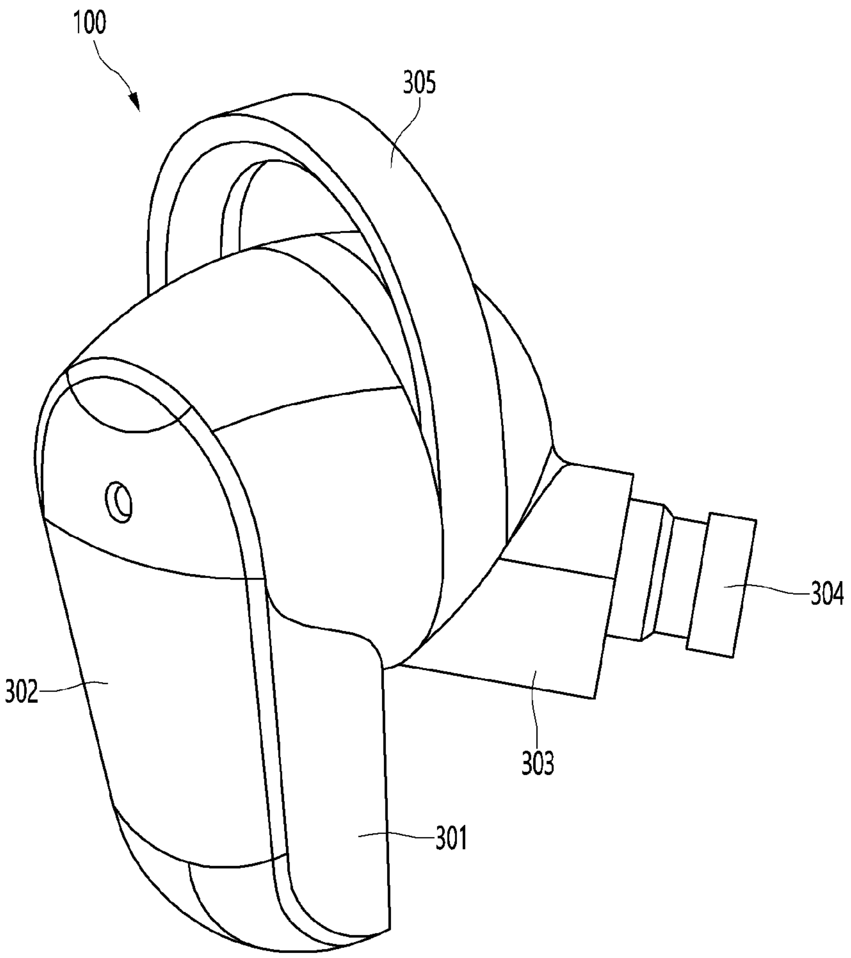
FIG. 3 is a perspective view of a wireless audio output device 100 according to an embodiment of the present disclosure.

FIG. 3 is a perspective view of a wireless audio output device 100 according to an embodiment of the present disclosure.

The kernel type wireless earphone as the wireless audio output device 100 shown in FIG. 3 is only an example, and the present disclosure is not limited thereto. That is, the wireless audio output device 100 in the present disclosure refers to various devices having a function of outputting audio, may include such as headphone, neckband type earphone, canal type earphone, open type earphone, bone conduction earphone, speaker, TV, radio, cell phone, smartphone, and the like.

Referring to FIG. 3, the wireless audio output device 100 includes a plurality of cases 301, 302, 303, and 305, and the cases 301, 302, 303, and 305 are combined to form a housing including a space mounting electronic components therein. The second case 302 coupled to one side of the first case 301 is exposed to the outside when the user wears the wireless audio output device 100, and the audio output unit 130 for outputting sound may be located on the other side of the first case 301 according to a sound signal and a sound passage 304 for transmitting sound to a user may be provided. A separate case 303 may be formed by separating a portion where the sound passage 304 is located so that components (example, the audio output unit 130 and the communication unit 110) may be easily mounted on the first case 301.

The wireless audio output device 100 is kernel-type and has a sound passage 304 protruding in a shape that can be inserted into the user's ear canal, and an ear tip may be coupled to the outside of the sound passage 304 so as to be in close contact with the user's ear.

Although not shown in FIG. 3, the cases 301, 302, 303, and 305 of the wireless audio output device 100 may include a user input unit 160, and the user may input a control signal for the wireless audio output device 100 through the user input unit 160.

Figure 4:
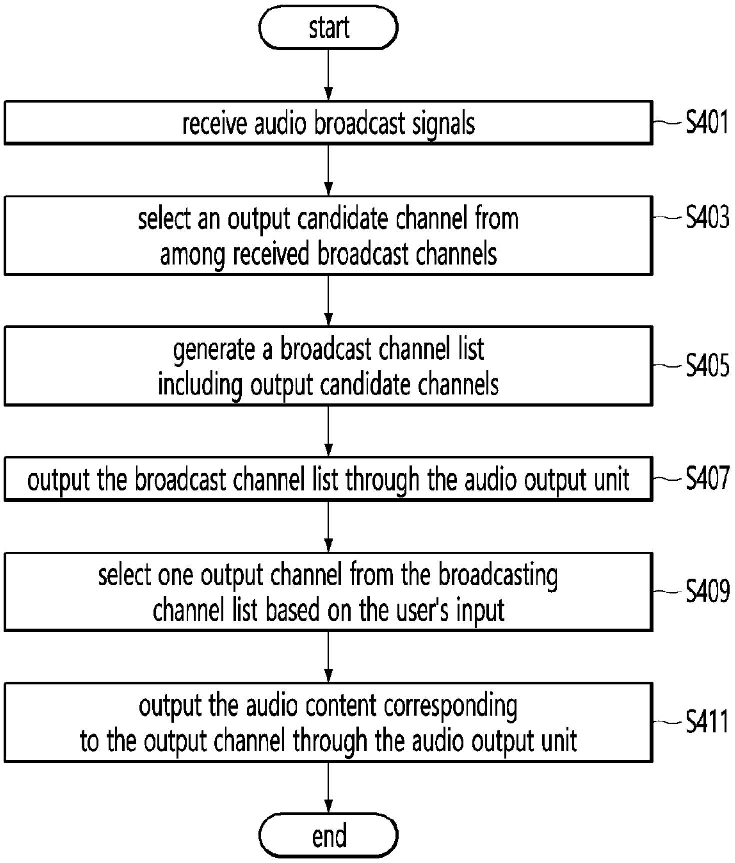
FIG. 4 is a flowchart illustrating a method of outputting content corresponding to an audio broadcast signal according to an embodiment of the present disclosure.

FIG. 4 is a flowchart illustrating a method of outputting content corresponding to an audio broadcast signal according to an embodiment of the present disclosure.

Referring to FIG. 4, the processor 190 of the wireless audio output device 100 receives audio broadcast signals through the communication unit 110 (S401).

The content providing device 200 may broadcast an audio broadcast signal through a wireless communication technology, and the wireless audio output device 100 may receive the audio broadcast signal broadcast from one or more content providing devices 200. Broadcast may refer to a communication method of transmitting a signal without specifying a receiver, such as a radio base station.

One content providing device 200 may transmit only one audio broadcast signal corresponding to one broadcast channel or may transmit a plurality of audio broadcast signals corresponding to a plurality of broadcast channels. Accordingly, the wireless audio output device 100 may receive a plurality of audio broadcast signals from one or more content providing devices 200.

The audio broadcast signal refers to a signal through which audio content or a broadcast channel audio data corresponding to is broadcast, and may include the audio content or channel information on broadcast channel. Channel information may include a channel name, a name of a content providing device, a location of the content providing device, and a name of content. Channel information may be obtained from an Electronic Program Guide (EPG).

The location of the content providing device may mean an actual geographic location (coordinates, etc.) or may be conceptual location information set by a user. For example, examples of the location of the content providing device may include "central lobby TV", "ceiling speaker", "entrance digital signage", and the like.

Also, the processor 190 of the wireless audio output device 100 selects an output candidate channel from among received broadcast channels corresponding to the audio broadcast signals (S403).

Even if the processor 190 receives a plurality of audio broadcast signals, some audio broadcast signals may have weak reception strength, a broadcast channel corresponding to a certain audio broadcast signal may be a broadcast channel that is not preferred by a user and a broadcast channel corresponding to a certain audio broadcast signal may be a broadcast channel preferred by a user. Accordingly, the processor 190 may select at least one output candidate channel from among received broadcast channels corresponding to the received audio broadcast signals. Output candidate channels may refer to channels constituting a broadcast channel list to be provided to a user.

A broadcast channel whitelist and a broadcast channel blacklist are stored in the memory 130, and the processor 190 may select one or more output candidate channels from among received broadcasting channels considering at least one of the broadcast channel whitelist, the broadcast channel blacklist, or received signal strength indication (RSSI).

The processor 190 may select a broadcast channel included in the broadcast channel whitelist among received broadcast channels as the output candidate channel. In addition, the processor 190 may not select a broadcast channel included in the broadcast channel blacklist or having a received signal strength indication lower than the first reference value among received broadcast channels as an output candidate channel. Also, the processor 190 may select, from among the received broadcast channels, a broadcast channel that is not included in the broadcast channel whitelist and the broadcast channel blacklist and has a received signal strength indication equal to or greater than a first reference value as an output candidate channel.

However, handling of a broadcast channel included in the broadcast channel whitelist among received broadcast channels but having a received signal strength indication lower than the first reference value may be handled differently according to embodiments. In an embodiment, if the received signal strength indication of a specific received broadcast channel is lower than the first reference value, the processor 190 may not select the received broadcast channel as the output candidate channel even if the corresponding received broadcast channel is included in the broadcast channel whitelist. Alternatively, in another embodiment, if a specific received broadcast channel is included in the broadcast channel whitelist, the processor 190 may select the corresponding received broadcast channel as the output candidate channel even if the received signal strength is lower than the first reference value. Alternatively, in another embodiment, the processor 190 may determine whether the received signal strength indication of a broadcast channel included in the broadcast channel whitelist is less than a second reference value having a value smaller than the first reference value, and if the received signal strength indication is equal to or greater than the second reference value, select the corresponding received broadcasting channel as the output candidate channel. That is, with respect to broadcast channels included in the broadcast channel whitelist, the criterion for determining received signal strength indication may be relaxed.

Then, the processor 190 of the wireless audio output device 100 generates a broadcast channel list including output candidate channels (S405).

The processor 190 may generate a broadcast channel list composed of the selected output candidate channels. The broadcasting channel list may refer to a list of broadcasting channels to be provided to the user among received broadcasting channels.

The processor 190 may sort output candidate channels included in the broadcast channel list based on at least one of user preference and received signal strength indication.

Then, the processor 190 of the wireless audio output device 100 outputs the broadcast channel list through the audio output unit 130 (S407).

The processor 190 may output channel information about output candidate channels included in the broadcast channel list through the audio output unit 130, thereby providing the user with information about the broadcast channel list as audio. When channel information is output as audio, channel information of several output candidate channels cannot be simultaneously output, and accordingly, the processor 190 can sequentially output channel information through the audio output unit 130. In particular, the processor 190 may sequentially output channel information on candidate output channels included in the broadcast channel list in the order in which candidate output channels are sorted.

If the wireless audio output device 100 is connected to an external audio output device (not shown), the processor 190 may output a broadcast channel list through the external audio output device (not shown).

Then, the processor 190 of the wireless audio output device 100 selects one output channel from the broadcasting channel list based on the user's input (S409).

The processor 190 may select one output channel from the broadcasting channel list by receiving a channel selection voice through the microphone 140, by receiving a button input for selecting a channel through the user input unit 160, or by acquiring a tag input recognizing the short-range communication tag of the content providing device 200 through the short-range communication module of the communication unit 110).

The channel selection voice may include the channel number (example, first channel or channel 1) in the broadcast channel list, a channel name of the output candidate channel (example, AA news channel or information broadcast channel, etc.), a name of the content providing device corresponding to the output candidate channel (example, central lobby TV or announcement speaker, etc.), the name of content provided by the output candidate channel (example, AA news or announcement, etc.), and the like.

The button input may include a first channel selection input, a next channel movement input, a previous channel movement input, and the like. The first channel selection input may refer to an input for selecting a first channel as the output channel among output candidate channels included in the broadcasting channel list. The next channel input may refer to an input for setting an output candidate channel in the next sorting order (or lower priority) of the currently selected output candidate channel among output candidate channels included in the broadcasting channel list as the output channel. In a state where the output channel is the last channel, the next channel input may mean an input for selecting the first channel as the output channel. The previous channel input may refer to an input for setting an output candidate channel in a previous sorting order (or priority) of a currently selected output candidate channel among output candidate channels included in the broadcasting channel list as the output channel. However, the previous channel input in the state where the output channel is the first channel may mean an input for selecting the last channel as the output channel.

Tag input refers to an input in which the short-range communication module included in the communication unit 110 recognizes the short-range communication tag of the content providing device 200, and through this, identification information of the content providing device 200 stored in the short-range communication tag may be obtained.

Although not shown in FIG. 4, the processor 190 may update a broadcast channel whitelist or a broadcast channel blacklist based on a user's input. For example, when the user applies an input for adding the first channel (the first channel for which channel information is output) to the whitelist, the processor 190 may add the first channel to the broadcasting channel whitelist. For example, when the user applies an input for adding the last channel (the channel for which channel information is output last) to the blacklist, the processor 190 may add the last channel to the broadcasting channel blacklist.

Then, the processor 190 of the wireless audio output device 100 outputs the audio content corresponding to the output channel through the audio output unit 130 (S411).

The processor 190 may convert an audio broadcast signal corresponding to an output channel selected from among the received audio broadcast signals into audio data, and output the converted audio data through the audio output unit 130 so that the output channel corresponding to the output channel Audio content can be output.

If the wireless audio output device 100 is connected to an external audio output device (not shown), the processor 190 may output audio content corresponding to an output channel through the external audio output device (not shown).

The sequence of steps shown in FIG. 4 is only an example, and the present disclosure is not limited thereto. That is, in one embodiment, the order of some of the steps shown in FIG. 4 may be exchanged and performed. Also, in one embodiment, some of the steps shown in FIG. 4 may be performed in parallel. Also, only some of the steps shown in FIG. 4 may be performed.

FIG. 4 illustrates only one cycle of a method of outputting audio content, and the method of outputting audio content shown in FIG. 4 may be repeatedly performed.

The steps shown in FIG. 4 may be performed when the wireless audio output device 100 operates in a channel scan mode.

Figure 5:
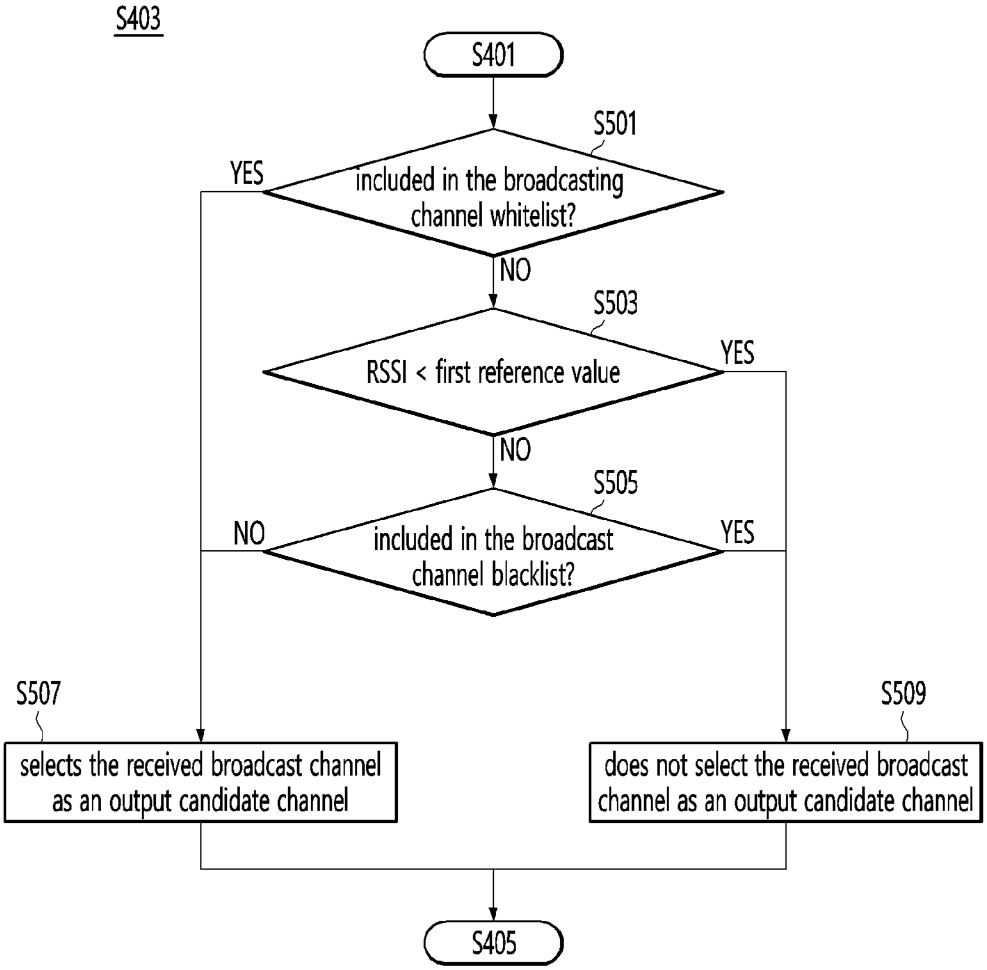
FIG. 5 is a flowchart illustrating an example of the step of selecting an output candidate channel shown in FIG. 4 (S403).

FIG. 5 is a flowchart illustrating an example of the step of selecting an output candidate channel shown in FIG. 4 (S403).

Referring to FIG. 5, the processor 190 of the wireless audio output device 100 determines whether the received broadcasting channel is included in the broadcasting channel whitelist (S501).

The processor 190 may determine whether each of the received broadcast channels is included in the broadcast channel whitelist. The broadcast channel whitelist may refer to a list of channels preferred by a user, and may be referred to as a preferred channel list.

As a result of the determination in step S501, if the received broadcast channel is included in the broadcast channel whitelist, the processor 190 of the wireless audio output device 100 selects the received broadcast channel as an output candidate channel (S507).

The processor 190 may select a broadcast channel included in the broadcast channel whitelist among received broadcast channels as a candidate output channel because it is a broadcast channel preferred by the user.

Furthermore, the processor 190 may add a whitelist tag to the corresponding received broadcast channel while selecting a received broadcast channel included in the broadcast channel whitelist as an output candidate channel.

As a result of the determination in step S501, if the received broadcast channel is not included in the broadcast channel whitelist, the processor 190 of the wireless audio output device 100 determines whether the RSSI of the received broadcast channel is less than the first reference value or not (S503).

The processor 190 may determine whether the RSSI for each of the received broadcast channels is less than a first reference value. The RSSI of the received broadcast channel may mean the RSSI of an audio broadcast signal corresponding to the received broadcast channel.

As a result of the determination in step S503, if the RSSI of the received broadcast channel is less than the first reference value, the processor 190 of the wireless audio output device 100 does not select the received broadcast channel as an output candidate channel (S509).

The processor 190 may not select a received broadcast channel as an output candidate channel because the reception sensitivity of a received broadcast channel having a received signal strength smaller than the first reference value is significantly lowered among received broadcast channels.

As a result of the determination in step S503, when the RSSI of the received broadcast channel is equal to or greater than the first reference value, the processor 190 of the wireless audio output device 100 determines whether the received broadcast channel is included in the broadcast channel blacklist (S505).

The processor 190 may determine whether each of the received broadcast channels is included in the broadcast channel blacklist. The broadcast channel blacklist may refer to a list of channels not preferred by the user, and may be referred to as a non-preferred channel list. The processor 190 may additionally determine whether a received broadcast channel is a non-preferred channel in that a received broadcast channel having a RSSI equal to or greater than the first reference value among received broadcast channels has sufficient reception quality.

As a result of the determination in step S505, if the received broadcast channel is not included in the broadcast channel blacklist, the processor 190 of the wireless audio output device 100 selects the received broadcast channel as an output candidate channel (S507).

A broadcast channel whose RSSI is sufficiently high and which is not included in the broadcast channel blacklist is sufficient to be selected as the output candidate channel.

As a result of the determination in step S505, if the received broadcast channel is included in the broadcast channel blacklist, the processor 190 of the wireless audio output device 100 does not select the received broadcast channel as the output candidate channel (S509).

Even if the RSSI is sufficiently high, the broadcast channels included in the broadcast channel blacklist are unfavorable to be selected as output candidate channels because they are not preferred by the user.

The sequence of steps shown in FIG. 5 is only an example, and the present disclosure is not limited thereto. That is, in one embodiment, the order of some of the steps shown in FIG. 5 may be exchanged and performed. Also, in one embodiment, some of the steps shown in FIG. 5 may be performed in parallel. Also, only some of the steps shown in FIG. 5 may be performed.

Figure 6:
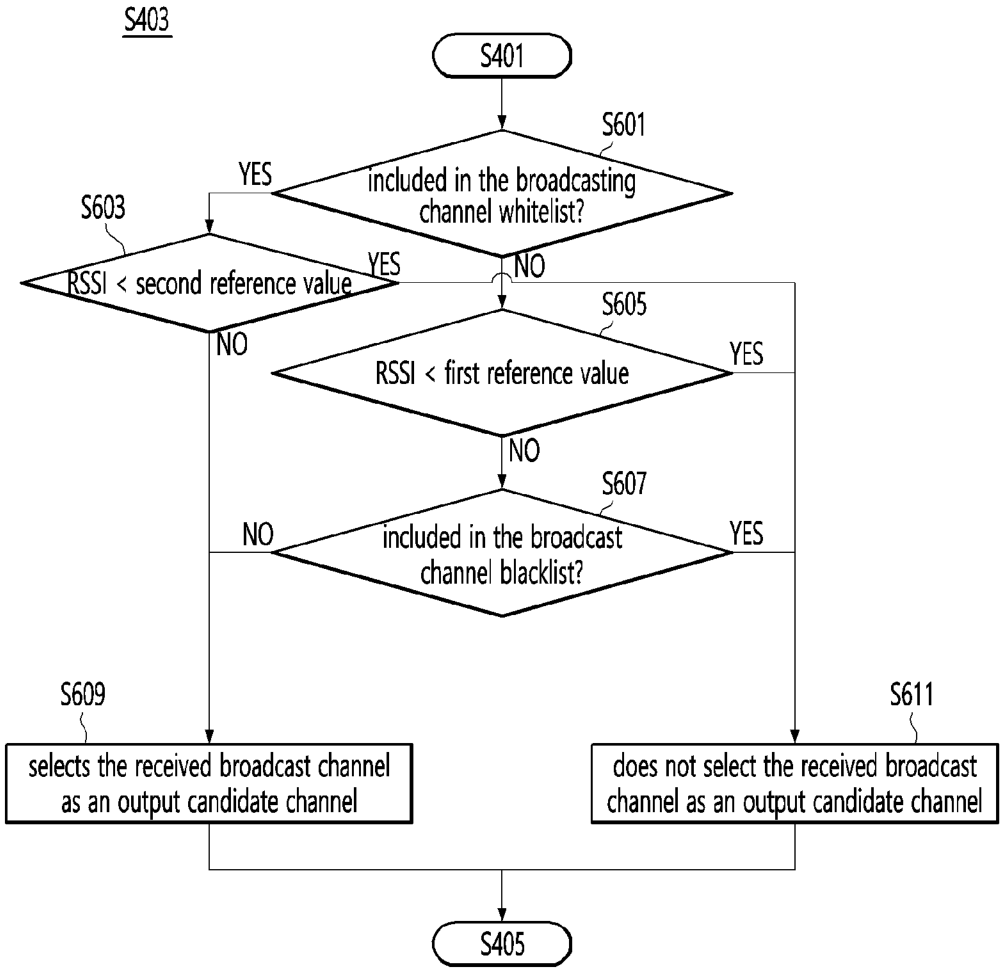
FIG. 6 is a flowchart illustrating an example of selecting an output candidate channel shown in FIG. 4 (S403).

FIG. 6 is a flowchart illustrating an example of selecting an output candidate channel shown in FIG. 4 (S403).

Referring to FIG. 6, the processor 190 of the wireless audio output device 100 determines whether the received broadcasting channel is included in the broadcasting channel whitelist (S601).

Since this step (S601) is the same as the step (S501) shown in FIG. 5, duplicate descriptions are omitted.

As a result of the determination in step S601, if the received broadcast channel is included in the broadcast channel whitelist, the processor 190 of the wireless audio output device 100 determines whether the RSSI of the received broadcast channel is less than the second reference value judged (S603).

The processor 190 may determine whether the RSSI of each of the received broadcast channels included in the broadcast channel whitelist is less than a second reference value. The second reference value may have a smaller value than the first reference value. That is, with respect to broadcast channels included in the broadcast channel whitelist, the criterion for determining received signal strength may be relaxed.

As a result of the determination in step S603, if the RSSI of the received broadcast channel is less than the second reference value, the processor 190 of the wireless audio output device 100 does not select the received broadcast channel as an output candidate channel (S611).

Even if a broadcast channel is included in the broadcast channel whitelist, if the RSSI is smaller than the second reference value, the reception quality of such a channel is very degraded. Accordingly, the processor 190 may not select a preferred channel as the output candidate channel if the received signal strength is less than the second reference value.

As a result of the determination in step S603, if the RSSI of the received broadcast channel is equal to or greater than the second reference value, the processor 190 of the wireless audio output device 100 selects the received broadcast channel as the output candidate channel (S609).

The processor 190 may select a broadcast channel included in the broadcast channel whitelist among received broadcast channels as a candidate output channel because it is a broadcast channel preferred by the user and has an acceptable reception quality.

Furthermore, the processor 190 may add a whitelist tag to the corresponding received broadcast channel while selecting a received broadcast channel included in the broadcast channel whitelist as an output candidate channel.

As a result of the determination in step S601, if the received broadcast channel is not included in the broadcast channel whitelist, the processor 190 of the wireless audio output device 100 determines that the RSSI of the received broadcast channel is less than the first reference value or not (S605).

Since this step (S605) is the same as the step (S503) shown in FIG. 5, duplicate descriptions are omitted.

As a result of the determination in step S605, if the RSSI of the received broadcast channel is less than the first reference value, the processor 190 of the wireless audio output device 100 does not select the received broadcast channel as the output candidate channel (S611).

Among the received broadcast channels not included in the broadcast channel whitelist, the processor 190 may not select a received broadcast channel having the RSSI smaller than the first reference value as the output candidate channel because reception sensitivity is remarkably low.

As a result of the determination in step S605, if the RSSI of the received broadcast channel is equal to or greater than the first reference value, the processor 190 of the wireless audio output device 100 determines whether the received broadcast channel is included in the broadcast channel blacklist (S607).

Since this step (S607) is the same as the step (S505) shown in FIG. 5, duplicate descriptions will be omitted.

As a result of the determination in step S607, if the received broadcast channel is not included in the broadcast channel blacklist, the processor 190 of the wireless audio output device 100 selects the received broadcast channel as the output candidate channel (S609).

A broadcast channel whose RSSI is sufficiently high and which is not included in the broadcast channel blacklist is sufficient to be selected as the output candidate channel.

As a result of the determination in step S607, if the received broadcast channel is included in the broadcast channel blacklist, the processor 190 of the wireless audio output device 100 does not select the received broadcast channel as the output candidate channel (S611).

Even if the RSSI is sufficiently high, the broadcast channels included in the broadcast channel blacklist are unfavorable to be selected the output candidate channel because they are not preferred by the user.

The sequence of steps shown in FIG. 6 is only an example, and the present disclosure is not limited thereto. That is, in one embodiment, the order of some of the steps shown in FIG. 6 may be exchanged and performed. Also, in one embodiment, some of the steps shown in FIG. 6 may be performed in parallel. Also, only some of the steps shown in FIG. 6 may be performed.

Figure 7:
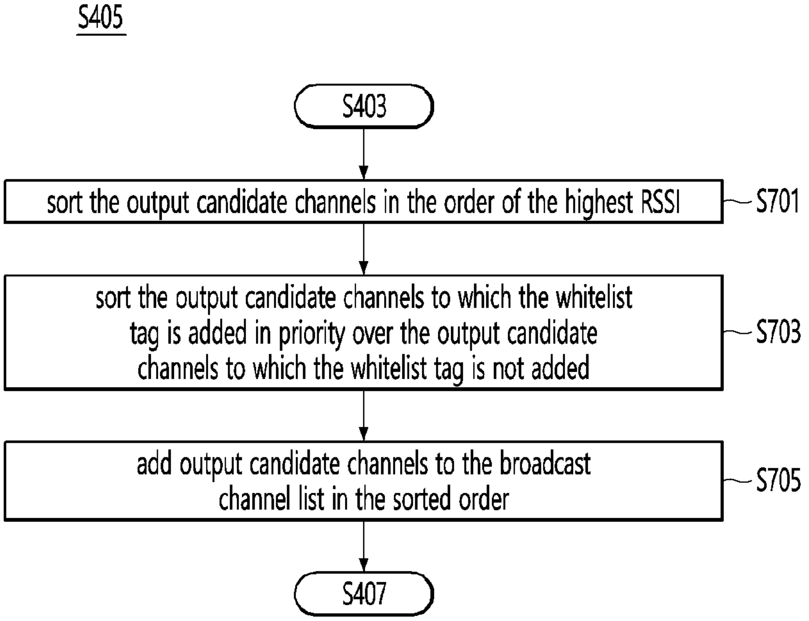
FIG. 7 is a flowchart illustrating an example of generating a broadcast channel list shown in FIG. 4 (S405).

FIG. 7 is a flowchart illustrating an example of generating a broadcast channel list shown in FIG. 4 (S405).

Referring to FIG. 7, the processor 190 of the wireless audio output device 100 sorts the output candidate channels in the order of the highest RSSI (in descending order) (S701).

The sorting order among output candidate channels may mean a channel guide order, a channel number (temporarily assigned), or a priority. That is, the processor 190 may give a higher priority as the RSSI increases.

Then, the processor 190 of the wireless audio output device 100 sorts the output candidate channels to which the whitelist tag is added in priority over the output candidate channels to which the whitelist tag is not added (S703).

The broadcasting channel whitelist may mean broadcasting channels preferred by the user, and accordingly, the whitelist tag may mean the user's preference. That is, the processor 170 may assign a higher priority to the output candidate channel to which a whitelist tag is added than the output candidate channel to which a whitelist tag is not added. This may refer to an embodiment in which user preference is prioritized over received signal sensitivity.

Then, the processor 190 of the wireless audio output device 100 adds output candidate channels to the broadcast channel list in the sorted order (S705).

In one embodiment, some of the steps shown in FIG. 7 may be performed in parallel. Also, only some of the steps shown in FIG. 7 may be performed.

Figure 8:
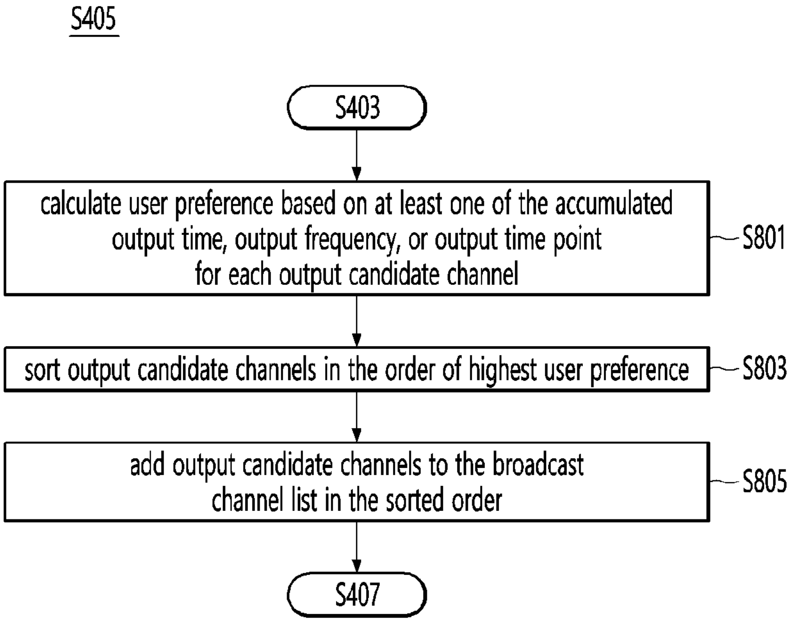
FIG. 8 is a flowchart illustrating an example of generating a broadcast channel list shown in FIG. 4 (S405).

FIG. 8 is a flowchart illustrating an example of generating a broadcast channel list shown in FIG. 4 (S405).

Referring to FIG. 8, the processor 190 of the wireless audio output device 100 calculates user preference based on at least one of the accumulated output time, output frequency, or output time point for each output candidate channel (S801).

The processor 190 may calculate user preference based on at least one of the accumulated output time, the output frequency, or the output time point for each output candidate channel. For example, the processor 190 may calculate the user preference highly as the accumulated output time is longer, the output frequency is higher, and the output time point is more recent.

Then, the processor 190 of the wireless audio output device 100 sorts output candidate channels in the order of highest user preference (S803).

Then, the processor 190 of the wireless audio output device 100 adds output candidate channels to the broadcast channel list in the sorted order (S805).

In one embodiment, some of the steps shown in FIG. 8 may be performed in parallel. Also, only some of the steps shown in FIG. 8 may be performed.

FIG. 9 is a diagram illustrating a broadcast channel whitelist according to an embodiment of the present disclosure.

Referring to FIG. 9, the broadcast channel whitelist 900 may include various items such as a channel name 911, a name of the content providing device 912, a location of the content providing device 913, and a content type 914.

In the example shown in FIG. 9, in a first whitelist item 921, a channel name 911 is "facility guidance", and in a second whitelist item 922, a content type 914 is "news", in a third whitelist item 923, the name 912 of the content providing device is "USER A's LG TV", and in a fourth whitelist item 924, a location 913 of the content providing device is "Incheon Airport Terminal 1 and in front of Gate 9". In this case, the processor 190 may select a guide broadcasting channel of each facility as the output candidate channel based on the first whitelist item 921, and select a channel whose content type is news as the output candidate channel based on the second whitelist item 922, and select a channel transmitted from the content providing device 200 whose name is "USER A's LG TV" as the output candidate channel based on the third whitelist item 923, and select a channel transmitted from the content output device 200 disposed in front of Gate 9 of Terminal 1 of Incheon International Airport as the output candidate channel based on the fourth white list item 924.

FIG. 10 is a diagram illustrating a broadcast channel blacklist according to an embodiment of the present disclosure.

Referring to FIG. 10, similar to the broadcast channel blacklist 910 shown in FIG. 9, the broadcast channel blacklist 1000 may include various items such as a channel name 1011, a name of the content providing device 1012, a location of the content providing device 1013 and a content type 1014.

In the example shown in FIG. 9, the channel name 1011 of the first blacklist item 1021 is "YY Home Shopping", and the content type 1014 of the second blacklist item 1022 is "advertisement". In this case, the processor 190 may exclude the "YY home shopping" channel from the output candidate channels based on the first blacklist item 1021, and exclude the channel whose content type is advertisement from the output candidate channels based on the second blacklist item 1022.

Figure 11:
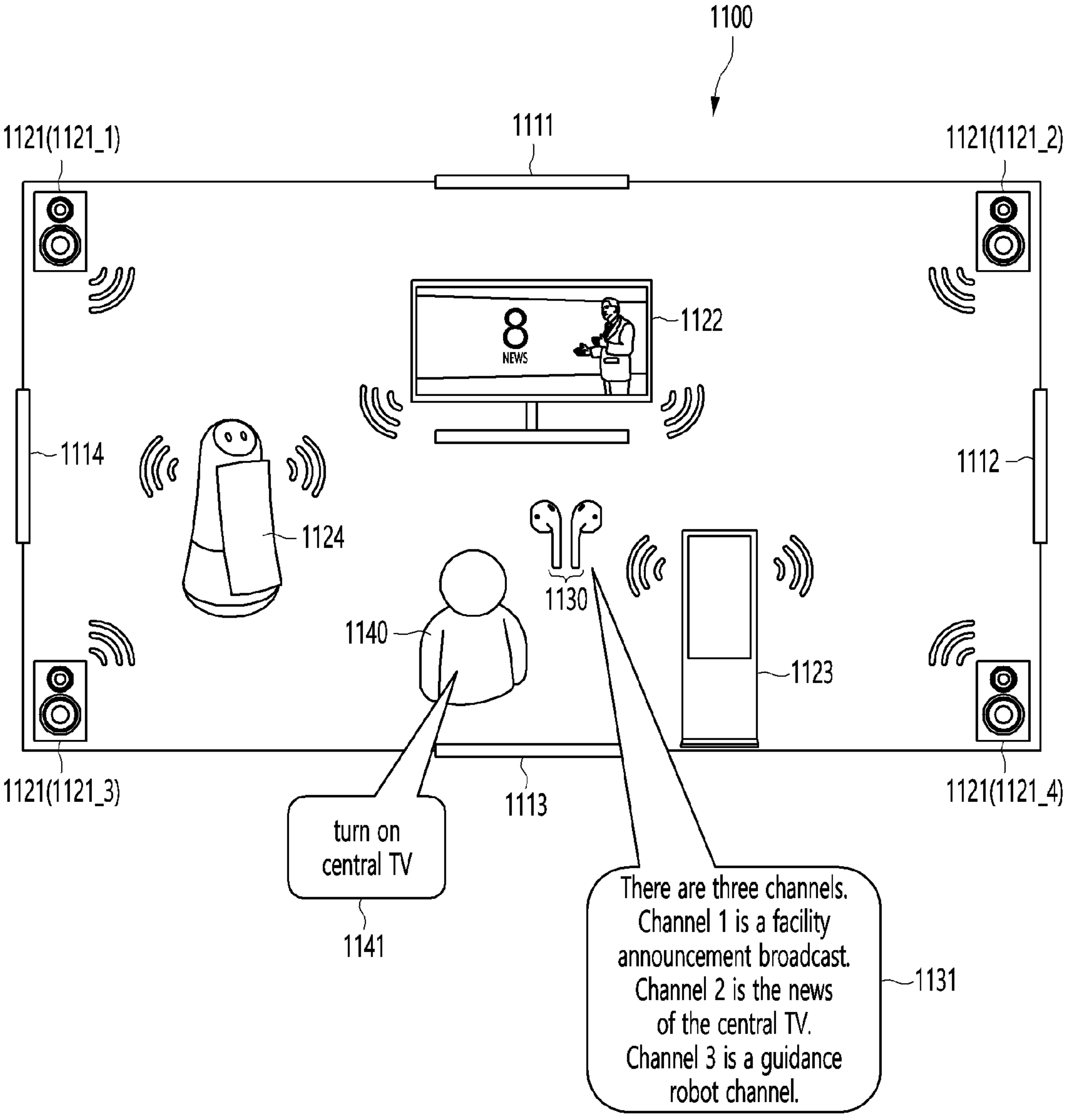
FIG. 11 is a diagram illustrating an embodiment of the present disclosure.

FIG. 11 is a diagram illustrating an embodiment of the present disclosure.

Referring to FIG. 11, an indoor space 1100 includes four gates 1111, 1112, 1113, and 1114. In addition, guide speakers 1121_1, 1121_2, 1121_3, and 1121_4 are disposed at four vertices of the indoor space 1100, a central TV 1122 is disposed at the center of the indoor space 1100, and a digital signage 1123 is disposed at the south gate 1113. And, the guide robot 1124 moves inside the indoor space 1100.

The four guide speakers 1121_1, 1121_2, 1121_3, and 1121_4 may be set as one guide speaker group 1121 to output the same broadcast, and the guide speaker group 1121 may broadcast audio signal of the facility announcement while outputting the facility announcement of the indoor space 1100 as a sound wave. The central TV 1122 may output a news broadcast through a display and a speaker, and may broadcast an audio signal for the news broadcast. The digital signage 1123 may output an advertisement through a display and a speaker, and may broadcast an audio signal for the advertisement. The guide robot 1124 may output user-customized information through a display and a speaker, and may broadcast an audio signal for the user-customized information.

It is assumed that the user 1140 can stay inside the indoor space 1100 while wearing the wireless audio output device 1130, and the user 1140 hates advertisement broadcasting and adds the advertisement broadcasting to the broadcasting channel blacklist.

The wireless audio output device 1130 may receive audio broadcast signal broadcast from the guide speaker group 1121, the central TV 1122, the digital signage 1123, and the guide robot 1124, only three broadcasting channels excluding advertisement of the digital signage 1123 that the user does not prefer can be selected as output candidate channels. Then, the wireless audio output device 1130 may output a list of broadcasting channels through the audio output unit, "There are three channels. Channel 1 is a facility announcement broadcast. Channel 2 is the news of the central TV. Channel 3 is a guidance robot channel" 1131. In addition, the user 1140 may input a channel selection command such as "Play the central TV" (1141) based on the broadcasting channel list output from the wireless audio output device 1130, and the wireless audio output device 1130 may output content of an audio broadcast signal broadcast from the central TV 1122 based on the channel selection command of the user 1140. Alternatively, the user 1140 "Play channel 2." Alternatively, a broadcast channel of the central TV 1122 may be selected by inputting the channel selection command such as "Play the news."

In the embodiment shown in FIG. 11, the user 1140 inputs the channel selection command by voice, but the present disclosure is not limited thereto. In one embodiment, the user 1140 may sequentially select broadcast channels included in the broadcast channel list by clicking a button provided on the wireless audio output device 1130. In addition, in one embodiment, the user 1140 may select the broadcasting channel for the recognized content output device by recognizing the guide speaker group 1121, the central TV 1122, the digital signage 1123, or the short-range communication tag of the guide robot 1124 through the wireless output device 1130.

According to an embodiment of the present disclosure, the above-described method can be implemented as computer readable code in a medium on which a program is recorded. The computer-readable medium includes all types of recording devices in which data that can be read by a computer system is stored. Examples of computer-readable media include Hard Disk Drive (HDD), Solid State Disk (SSD), Silicon Disk Drive (SDD), ROM, RAM, CD-ROM, magnetic tape, floppy disk, optical data storage device, etc.

What is claimed is:

1. A wireless audio output device for outputting audio content comprising:

an audio output unit;

a memory configured to store a broadcast channel whitelist and a broadcast channel blacklist;

a communication unit configured to receive audio broadcast signals; and a processor configured to:

generate a broadcast channel list including one or more output candidate channels among received broadcast channels corresponding to the audio broadcast signals, output the broadcast channel list through the audio output unit, select an output channel from the broadcasting channel list based on a user's input and based on at least one of the broadcast channel whitelist, the broadcast channel blacklist, or a received signal strength indicator (RSSI), and output audio content corresponding to the selected output channel through the audio output unit.

2. The wireless audio output device of claim 1, wherein the processor sequentially outputs channel information for the one or more output candidate channels included in the broadcast channel list through the audio output unit.

3. The wireless audio output device of claim 2, wherein the channel information includes at least one of a channel name corresponding to the output candidate channel, a name of a content providing device corresponding to the output candidate channel, a location of the content providing device corresponding to the output candidate channel, or a name of a content provided by the output candidate channel.

4. The wireless audio output device of claim 1, wherein a broadcast channel included in the broadcast channel whitelist is selected as the selected output channel, and a broadcast channel included in the broadcast channel blacklist or a broadcast channel for which the RSSI is lower than a reference value is excluded from selection.

5. The wireless audio output device of claim 1, wherein the processor sorts the one or more output candidate channels included in the broadcast channel list based on at least one of a user preference or the RSSI, and sequentially outputs channel information of the one or more output candidate channels included in the broadcast channel list in a sorted order through the audio output unit.

6. The wireless audio output device of claim 5, wherein the processor calculates the user preference based on at least one of an accumulated output time, an output frequency, or an output time point for each output candidate channel.

7. The wireless audio output device of claim 6, wherein the processor calculates the user preference to be higher as the accumulated output time is longer, the output frequency is higher, or the output time point is more recent for the output candidate channel.

8. The wireless audio output device of claim 2, further comprising:

a microphone configured to receive a channel selection voice input of the user, wherein the processor selects the output channel based on the voice input.

9. The wireless audio output device of claim 2, further comprising:

a short-range communication module, the processor selects the output channel by recognizing a short-range communication tag of a content providing device corresponding to the one or more output candidate channels through the short-range communication module.

10. The wireless audio output device of claim 2, further comprising:

a user input unit configured to receive a button input of the user, wherein the processor selects the output channel based on the button input.

11. The wireless audio output device of claim 10, wherein the processor changes the output channel to another broadcast channel included in the broadcast channel list based on the button input.

12. A method of outputting audio content, the method comprising:

receiving audio broadcast signals;

generating a broadcast channel list including one or more output candidate channels among received broadcast channels corresponding to the audio broadcast signals;

outputting the broadcast channel list;

selecting an output channel from the broadcasting channel list based on a user's input and based on at least one of a broadcast channel whitelist stored in a memory, a broadcast channel blacklist stored in the memory, or a received signal strength indicator (RSSI), and outputting audio content corresponding to the selected output channel.

13. A wireless audio output device for outputting audio content comprising:

an audio output unit;

a short-range communication module;

a communication unit configured to receive audio broadcast signals; and a processor configured to:

generate a broadcast channel list including one or more output candidate channels among received broadcast channels corresponding to the audio broadcast signals, output the broadcast channel list through the audio output unit, select an output channel from the broadcasting channel list based on a user's input and based on recognizing a short-range communication tag of a content providing device corresponding to the one or more output candidate channels through the short-range communication module, and output audio content corresponding to the selected output channel through the audio output unit.

14. A method of outputting audio content, the method comprising:

receiving audio broadcast signals;

generating a broadcast channel list including one or more output candidate channels among received broadcast channels corresponding to the audio broadcast signals;

outputting the broadcast channel list;

selecting an output channel from the broadcasting channel list based on a user's input and based on recognizing a short-range communication tag of a content providing device corresponding to the one or more output candidate channels through a short-range communication module, and outputting audio content corresponding to the selected output channel.

* * * * *